(12) United States Patent
Dahl et al.

(10) Patent No.: US 7,141,747 B2
(45) Date of Patent: Nov. 28, 2006

(54) SWITCHING APPARATUS HAVING A WITHDRAWABLE-PART RACK AND A LOCKABLE POWER CIRCUIT BREAKER

(75) Inventors: Joerg-Uwe Dahl, Werder (DE); Michael Kruschke, Schwante (DE); Marc Liebetruth, Glienicke (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/293,280

(22) Filed: Dec. 5, 2005

(65) Prior Publication Data

US 2006/0118397 A1 Jun. 8, 2006

(30) Foreign Application Priority Data

Dec. 6, 2004 (DE) .................... 10 2004 059 095

(51) Int. Cl.
*H01H 9/20* (2006.01)
(52) U.S. Cl. ................... 200/50.21; 200/50.27
(58) Field of Classification Search .. 200/50.21–50.27; 361/605–611, 615
See application file for complete search history.

(56) References Cited

U.S. PATENT DOCUMENTS

| | | | |
|---|---|---|---|
| 2,273,001 A | | 2/1942 | Mahoney et al. |
| 4,281,227 A | * | 7/1981 | Rexroad et al. ......... 200/50.21 |
| 4,773,870 A | * | 9/1988 | Sinnig ..................... 200/50.27 |
| 5,495,388 A | * | 2/1996 | Bonetti et al. ............. 200/50.1 |
| 6,265,678 B1 | * | 7/2001 | Robbins et al. .......... 200/50.21 |
| 6,590,170 B1 | * | 7/2003 | Jenkins .................... 200/50.21 |
| 6,864,444 B1 | * | 3/2005 | Anger et al. ............. 200/50.21 |
| 7,064,283 B1 | * | 6/2006 | Deylitz et al. ........... 200/50.21 |
| 2006/0049025 A1 | | 3/2006 | Schmidt et al. |

FOREIGN PATENT DOCUMENTS

| | | |
|---|---|---|
| DE | 74 38 652 | 3/1975 |
| DE | 30 15 259 A1 | 10/1981 |
| DE | 92 12 149 | 3/1994 |
| DE | 43 13 647 A1 | 10/1994 |
| DE | 196 47 747 C1 | 4/1998 |
| DE | 100 06 427 C2 | 7/2002 |
| DE | 102 51 002 B3 | 5/2004 |
| EP | 0 886 355 A2 | 12/1998 |
| EP | 0 886 355 A3 | 12/1998 |
| GB | 2 279 501 A | 1/1995 |

\* cited by examiner

Primary Examiner—Michael A. Friedhofer
(74) Attorney, Agent, or Firm—Harness, Dickey & Pierce, P.L.C.

(57) ABSTRACT

A power circuit breaker is intended to be effectively locked in a simple manner in a withdrawable-part rack. For this purpose, a locking device is provided having a first component, which is fixed in the withdrawable-part rack, and a second component, which is fixed to the power circuit breaker. The first component and the second component do not engage with one another in the inserted position. However, in the event of a short circuit they engage with one another in a tilted position of the power circuit breaker, which position is rotated with respect to the inserted position, with the result that the power circuit breaker is locked in the withdrawable-part rack.

14 Claims, 4 Drawing Sheets

SWITCHING APPARATUS HAVING A WITHDRAWABLE-PART RACK AND A LOCKABLE POWER CIRCUIT BREAKER

The present application hereby claims priority under 35 U.S.C. §119 on German patent application number DE 10 2004 059 095.8 filed Dec. 6, 2004, the entire contents of which is hereby incorporated herein by reference.

FIELD

The invention generally relates to a switching apparatus having a withdrawable-part rack for arrangement in a switchgear assembly, a power circuit breaker which can be inserted into the withdrawable-part rack and assumes an inserted position in the inserted state, and/or a locking device for the purpose of locking the power circuit breaker in the withdrawable-part rack.

BACKGROUND

In the case of switching devices having a withdrawable design, the power circuit breaker is held in the associated withdrawable-part rack by way of a self-inhibiting displacement mechanism in the operating position. Since the connections of the power circuit breaker are generally arranged on one side, when a power circuit breaker is switched on, a current loop results. If high short-circuit currents occur, the forces of the current loop act counter to the insertion direction and thus attempt to drive the breaker out of the withdrawable part. If the locking by way of the displacement mechanism does not withstand the forces, under certain circumstances the breaker is moved out of the operating position to a greater extent than the laminated contacts of the power circuit breaker engage in the connection rail of the withdrawable-part rack. This leads to a system failure.

The patent specification DE 102 51 002 B3 has disclosed a generic power circuit breaker. In this case, a locking device is actuated by a switch mechanism, in particular by a switching shaft of the power circuit breaker. The locking device includes an actuating element which is arranged such that it is fixed against rotation on the switching shaft and interacts with a locking bolt. The locking bolt is arranged such that it can be displaced axially and is guided by guide rollers. This locking mechanism is very complex in design terms, however.

A further possibility for reducing the current forces on the power circuit breaker is the use of current-limiting power circuit breakers which limit the prospective short-circuit current and thus also the current-loop forces occurring. These devices have only low selectivity, however, i.e. they can only withstand the short circuit for a very short period of time, with the result that downstream switches in a power circuit distribution system do not have the option of switching off before the power circuit breaker.

SUMMARY

An object of at least one embodiment of the present invention thus resides in improving the locking of a power circuit breaker in a withdrawable-part rack using measures which are simple in design terms.

This object may be achieved according to at least one embodiment of the invention by a switching apparatus having a withdrawable-part rack for arrangement in a switchgear assembly, a power circuit breaker which can be inserted into the withdrawable-part rack and assumes an inserted position in the inserted state, and a locking device for the purpose of locking the power circuit breaker in the withdrawable-part rack, the locking device having a first component, which is fixed to the withdrawable-part rack, and a second component, which is fixed to the power circuit breaker, and the first component and the second component not engaging with one another in the inserted position, but engaging with one another in a defined manner in a tilted position of the power circuit breaker, which position is rotated with respect to the inserted position, with the result that the power circuit breaker is locked in the withdrawable-part rack.

With the locking device according to at least one embodiment of the invention, the switching apparatus is thus not prevented from being tilted from the beginning but is allowed to tilt intentionally within narrow limits. The tilting then results in the power circuit breaker being locked in the withdrawable-part rack. Once the short circuit has been interrupted, the power circuit breaker is then again lowered back to its usual operating position or can be pushed into this position with the following removal operation, with the result that it can be removed from the withdrawable-part rack, possibly once further locks have been eliminated.

The locking device, according to at least one embodiment of, includes a third component on the withdrawable-part rack and a fourth component on the power circuit breaker, and the two components form a rotary bearing in a locked state, it being possible for the power circuit breaker to be tilted about this rotary bearing into the tilted position. These third and fourth components are generally in the form of a bolt and a bearing plate and are typically used for locking the power circuit breaker in the withdrawable-part rack at the level of a guide rail of the withdrawable-part rack.

The first component of the locking device advantageously has a predefined distance from the second component in the direction perpendicular to the insertion direction when the power circuit breaker is inserted into the withdrawable-part rack. The power circuit breaker can thus easily be inserted into the withdrawable-part rack or removed from said withdrawable-part rack. This predefined distance may also assume the value of zero.

The first component of the locking device may be in the form of, for example, a transverse strut between two opposing walls of the withdrawable-part rack. There is thus a cost-effective locking component which can be mounted in a simple manner. Other ways in which the power circuit breaker can be fixed in the withdrawable part are also conceivable.

In accordance with at least one embodiment of the present invention, the second component has a hook which engages behind the first component in the tilted position. If the power circuit breaker is rotated back to the normal inserted position, the hook also no longer engages behind the first component of the locking device.

In one development, the second component has a central section, which extends in the insertion direction, and an end section protruding perpendicularly thereto, a ramp extending at an angle connecting the central section and the end section. This ramp extending at an angle makes it easier to remove the power circuit breaker from the withdrawable-part rack if the short circuit is interrupted and the power circuit breaker is nevertheless in the tilted position.

A foot section of the second component, by which the second component is fixed to the power circuit breaker, can support, for example, a vertical connection of the power circuit breaker. The second component thus has the dual function of supporting and locking in the event of a short circuit.

Under certain circumstances, the power circuit breaker is of three-pole or multipole design, and an above mentioned locking device is fitted to the power circuit breaker or withdrawable-part rack for at least one pole.

BRIEF DESCRIPTION OF THE DRAWINGS

Example embodiments of the present invention will now be explained in more detail with reference to the attached drawings, in which.

DETAILED DESCRIPTION OF THE EXAMPLE EMBODIMENTS

The example embodiment explained in more detail below represents one example embodiment of the present invention.

Figure 1:
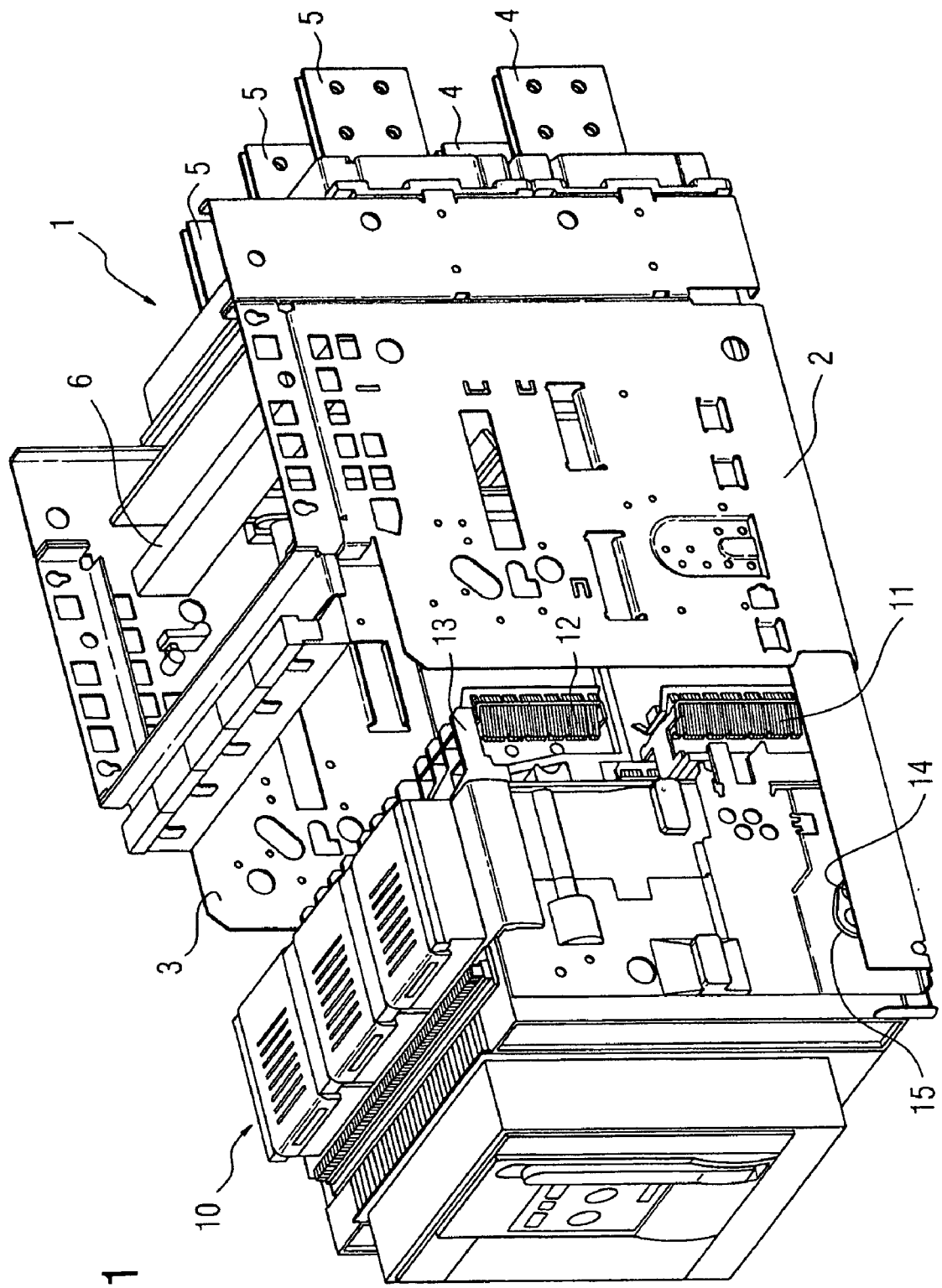
FIG. 1 shows a perspective view of a withdrawable-part rack and a power circuit breaker in the withdrawn state.

FIG. 1 depicts a switching apparatus according to at least one embodiment of the invention in a perspective view. The right-hand half illustrates a withdrawable-part rack 1 having two side walls 2 and 3. Vertical connections, which are also referred to as busbars, are arranged on the reverse of the withdrawable-part rack. The current flows in each case into a lower vertical connection 4 and out of an upper vertical connection 5, or vice versa. Furthermore, the two side walls 2 and 3 of the withdrawable-part rack 1 are connected by a transverse strut 6. In the present case, the transverse strut 6 has a rectangular profile and is preferably made from a metal.

The left-hand side of FIG. 1 shows a power circuit breaker 10 which has corresponding lower laminated blocks 11 for the purpose of making contact with the lower vertical connections 4 and upper laminated blocks 12 for the purpose of making contact with the upper vertical connections 5. Stops 13 are provided above the upper laminated blocks 12 and have a dual function. Firstly, they support the upper laminated blocks 12 against being tilted upwards. Furthermore, they serve the purpose of stopping the power circuit breaker 10 in the withdrawable-part rack 1 in the event of a short circuit, as will be explained in more detail below.

A locking bolt 14, which can be moved by a crank handle 15, serves the purpose of locking the power circuit breaker 10 in the withdrawable-part rack 1 in the inserted state.

Figure 2:
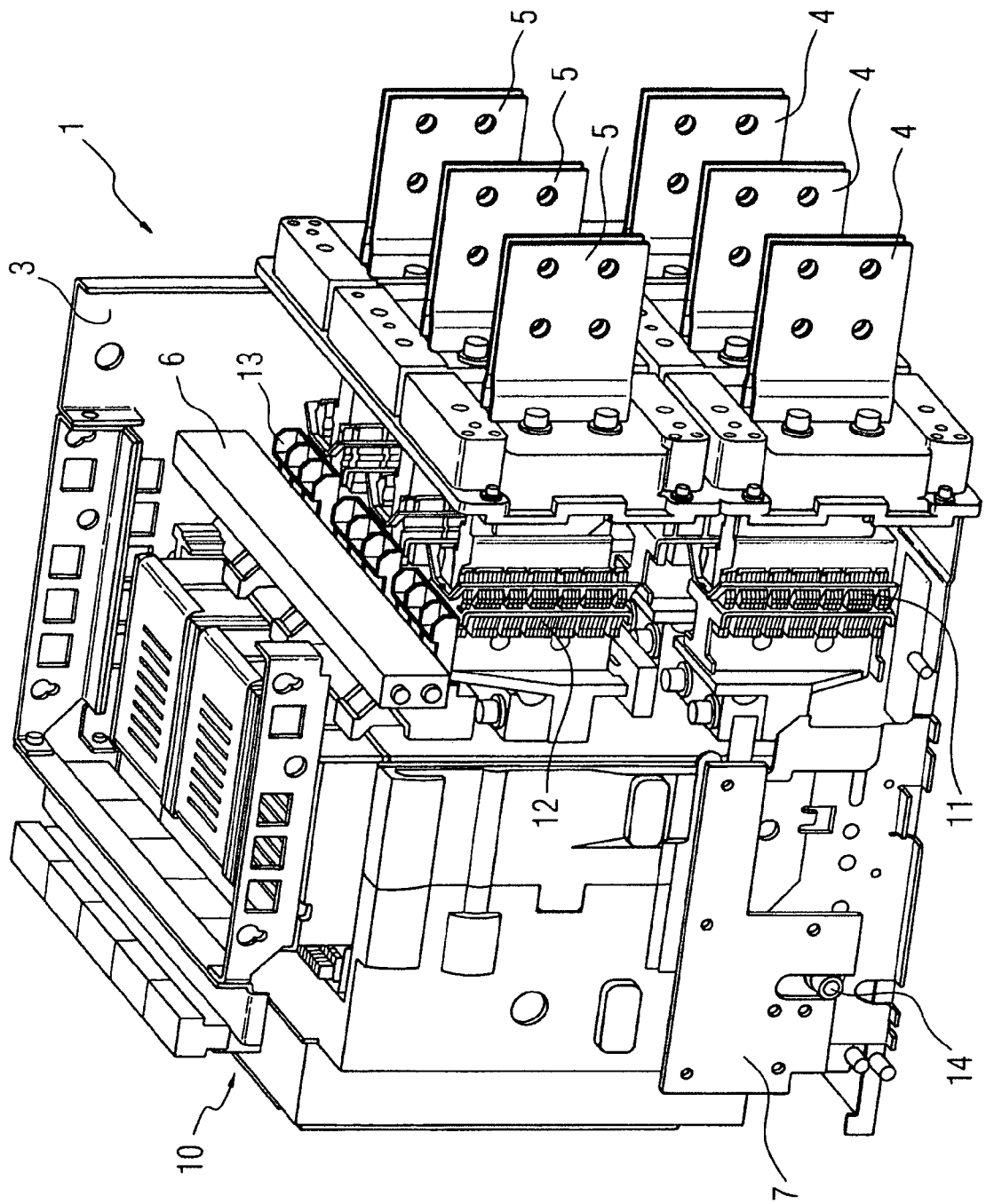
FIG. 2 shows a perspective view of the power circuit breaker in a state in which it is inserted in the withdrawable-part rack.

FIG. 2 illustrates the power circuit breaker 10 in its state in which it is inserted into the withdrawable-part rack 1. The front side wall 2 of the withdrawable-part rack 1 is not shown in FIG. 2.

In the inserted state, i.e. in the inserted position, the laminated blocks 11 and 12 of the power circuit breaker 10 make contact with the respective vertical connections 4 and 5 of the withdrawable-part rack 1. In addition, the locking bolt 14 engages in a bearing plate 7 of the withdrawable-part rack 1 in the locked state.

Figure 3:
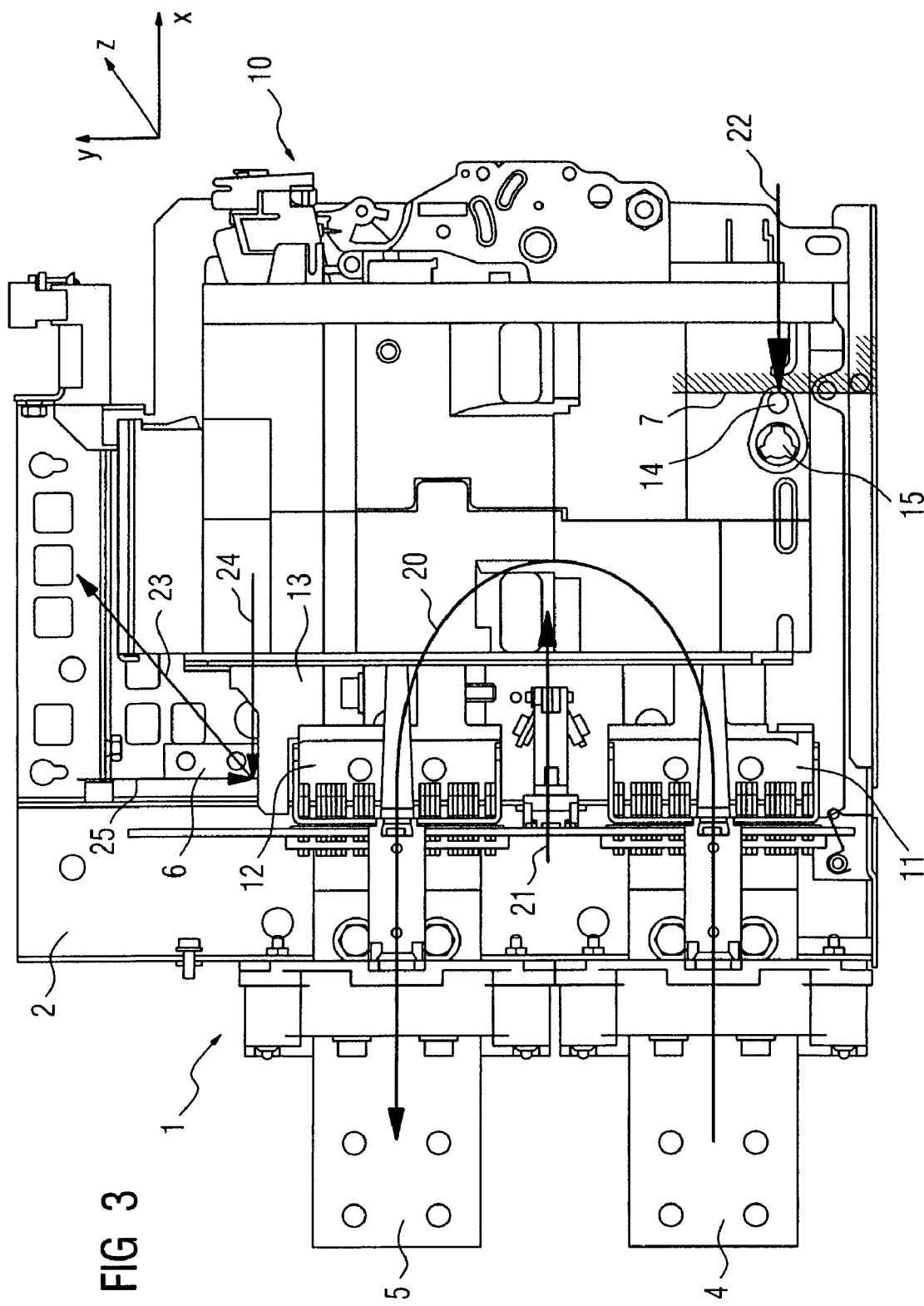
FIG. 3 shows a side view of the power circuit breaker in the inserted state with the side wall of the withdrawable-part rack removed.

FIG. 3 illustrates a side view of the power circuit breaker 10 (shown in FIG. 2) inserted in the withdrawable-part rack 1. Once the arrangement of the reverse has been illustrated on the basis of the illustration in FIG. 2, the side wall 2 is illustrated here, but not the side wall 3 of the withdrawable-part rack 1.

As a point of reference, a Cartesian coordinate system with the axes x, y and z is illustrated in FIG. 3. In this case, the x-y plane corresponds to the plane of the drawing.

If the power circuit breaker 10 is switched on, there is a current flow from the lower vertical connection 4, through the lower laminated block 11, the power circuit breaker 10, the upper laminated block 12 to the upper vertical connection 5. This current flow is illustrated by the current loop 20 in FIG. 3. Owing to the alternating current, the current flows temporarily in the opposite direction. In this case, a supply from "above" and "below" is possible.

The current loop 20 leads to a current-loop force 21 which attempts to force the power circuit breaker 10 out of the withdrawable-part rack 1. In order to prevent the power circuit breaker 10 from being knocked out of the withdrawable-part rack 1, the locking bolt 14 of the power circuit breaker 10 bears against the bearing plate 7 of the withdrawable-part rack 1. The bearing plate 7 is in this case illustrated merely symbolically. Owing to the locking, the bearing plate 7 applies a bearing force 22.

The geometrical arrangement of the current-loop force 21 with respect to the bearing force 22, which is applied by the withdrawable-part rack 1 with respect to the circuit breaker 10, brings about a resulting force which needs to be supported. If the forces lie, for example, on one plane with the same y value, no torque is produced on the circuit breaker about the z axis. This would be the case if the bearing force 22 were to be arranged at the level (y direction) of the current-loop force 21. In this case, the bearing would need to be capable of absorbing the total resulting force, however.

However, the forces do not generally lie in one plane since this is extremely difficult to achieve when taking into account all the required modules. In particular, it is favorable for design reasons to place the locking mechanism with the locking bolt 14 in the vicinity of the guide rail 8 since the crank handle of the insertion and withdrawal mechanism for the power circuit breaker 10 is also arranged there.

If the current-loop force 21 and the bearing force 22 (both in the x direction) are now not located at the same y level, in the event of a short-circuit current the breaker 10 is tilted about the bearing bolt 14 according to the movement arrow 23. Since it is necessary to prevent a relatively large movement in this regard, a second bearing needs to assist the corresponding forces. This second bearing can be controlled by the insertion mechanism, for example (not illustrated in FIG. 3). Such a bearing with moving parts is cost-intensive, however.

At least one embodiment of the invention therefore proposes a cost-effective bearing with the transverse strut 6, which is fixed to the withdrawable-part rack 1, and the stop 13, which is fixed to the power circuit breaker 10. In accordance with this solution, no moving parts and thus also no control are required. In the event of a short circuit, the transverse strut 6 assists the forces occurring after a defined tilting movement of the power circuit breaker 10. Thus, the transverse strut 6 applies the additional bearing forces 24 and 25 which act in the x direction and y direction.

Figure 4:
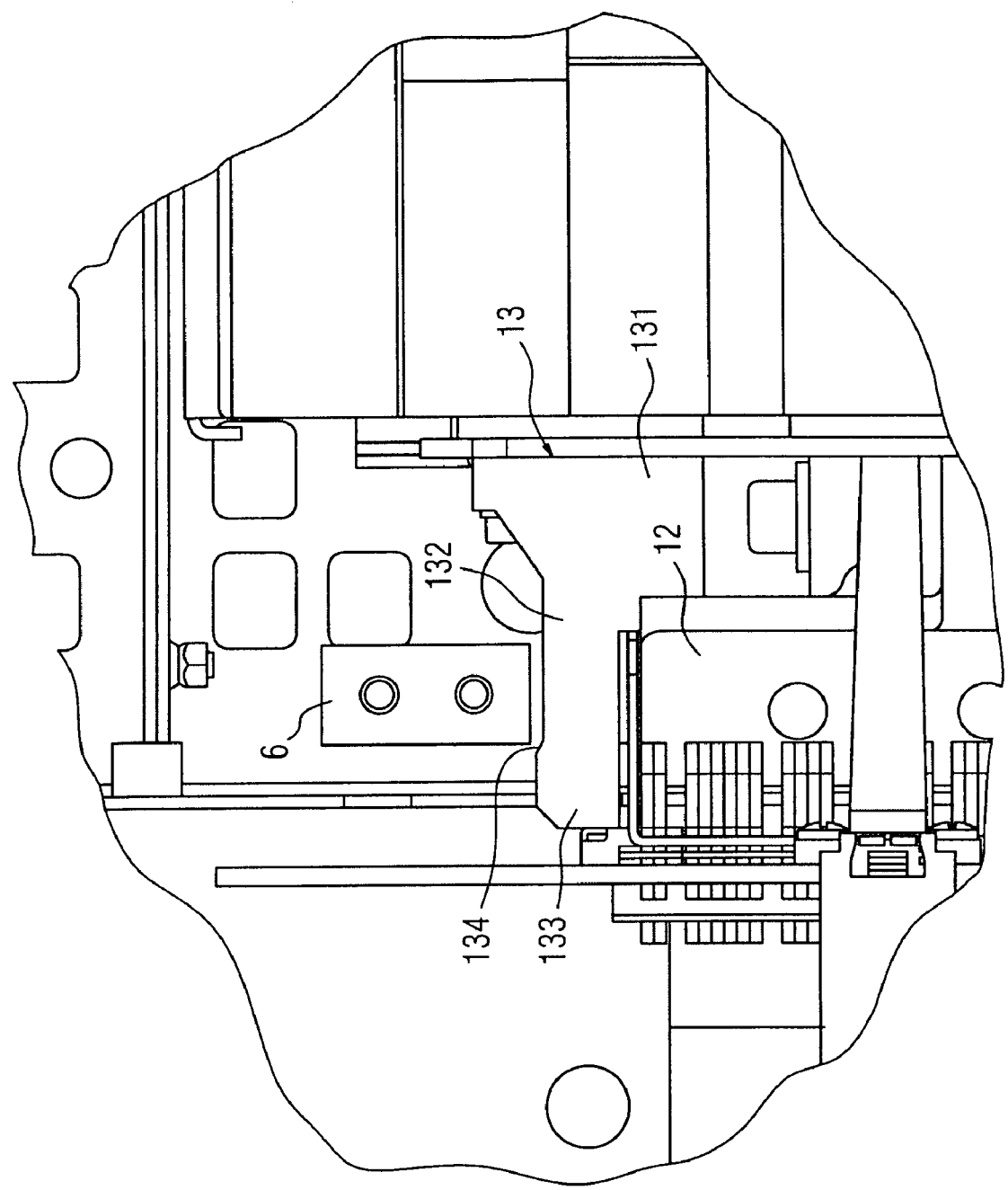
FIG. 4 shows an enlarged section from FIG. 3.

The additional locking mechanism for the purpose of limiting the tilting movement is shown as an enlarged illustration in FIG. 4. When viewed in profile, the stop 13 has a foot section 131, a central section 132, which predominantly extends in the insertion direction (x direction), and an end section 133. The end section 133 protrudes slightly in the y direction beyond the central section 132 such that the stop 13 has a hook-shaped design. The end section 133 and the central section 132 are connected to a ramp 134 extending at an angle.

As can also be seen in FIG. 4, the stop 13 has a dual function. Firstly, its foot section 131 supports the upper laminated block 12 against a tilting movement in relation to the circuit breaker 10 in the clockwise direction, which tilting movement would be brought about by a force caused by the currents flowing in the vertical connections. Secondly, the stop 13 serves the purpose of limiting a tilting movement of the overall circuit breaker 10 in the event of a short-circuit current since it is displaced with the circuit breaker 10 on insertion beneath the transverse strut 6 of the withdrawable-part rack and engages behind the transverse strut 6 in the event of a tilting movement. Owing to the end section 133, which protrudes in the y direction beyond the central section 132 and by means of which it is possible to engage behind the transverse strut 6, the force component which brings about a horizontal movement is assisted.

The ramp 134 acts as a stop face in the event of a short circuit and, once the short-circuit current has been interrupted, serves the purpose of enabling easier removal of the power circuit breaker 10 more easily from the withdrawable-part rack 1. Either the power circuit breaker 10 is lowered down again by its own weight when the short circuit is interrupted such that the end section 133 is located beneath the transverse strut 6 or else it can be pushed downwards easily and assisted by the ramp 134. It is thus in any case possible to remove the power circuit breaker 10.

The transverse strut 6 and the corresponding stop 13 are arranged in the vicinity of the busbar 5. This is advantageous since the current-loop forces are assisted where they are introduced into the circuit breaker. The additional bearing or limiting of the tilting movement can in principle also take place at another point in the withdrawable-part rack 1.

Instead of shaping the stop 13 with a ramp 134, it would also be possible to provide a corresponding radius there. It is only essential here that subsequent removal of the power circuit breaker 10 from the withdrawable-part rack 1 is possible.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCES

| | |
|---|---|
| 1 | Withdrawable-part rack |
| 2, 3 | Side walls |
| 4 | Lower vertical connections |
| 5 | Upper vertical connections |
| 6 | Transverse strut |
| 7 | Bearing plate |
| 10 | Power circuit breaker |
| 11 | Lower laminated blocks |
| 12 | Upper laminated blocks |
| 13 | Stops |
| 14 | Locking bolt |
| 15 | Crank handle |
| 20 | Current loop |
| 21 | Current-loop force |
| 22, 24, 25 | Bearing forces |

-continued

| | |
|---|---|
| 23 | Movement arrow |
| 131 | Foot section |
| 132 | Central section |
| 133 | End section |
| 134 | Ramp |

What is claimed is:

1. A switching apparatus comprising:
a withdrawable-part rack for arrangement in a switchgear assembly;
a power circuit breaker, insertable into the withdrawable-part rack and assuming an inserted position in an inserted state; and
a locking device to lock the power circuit breaker in the withdrawable-part rack, the locking device including,
a first component, fixed to the withdrawable-part rack, and
a second component, fixed to the power circuit breaker, wherein the first component and the second component do not engage with one another in the inserted position, but engage with one another in a defined manner in a tilted position of the power circuit breaker, which position is rotated with respect to the inserted position, with the result that the power circuit breaker is locked in the withdrawable-part rack.

2. The switching apparatus as claimed in claim 1, wherein the locking device includes a third component on the withdrawable-part rack and a fourth component on the power circuit breaker, and wherein the two components form a rotary bearing in a locked state, it being possible for the power circuit breaker to be tilted about the rotary bearing into the tilted position.

3. The switching apparatus as claimed in claim 2, wherein the first component includes a predefined distance from the second component in the direction perpendicular to the insertion direction when the power circuit breaker is inserted into the withdrawable-part rack.

4. The switching apparatus as claimed in claim 3, wherein the first component of the locking device is mounted as a transverse strut between two opposing walls of the withdrawable-part rack.

5. The switching apparatus as claimed in claim 2, wherein the first component of the locking device is mounted as a transverse strut between two opposing walls of the withdrawable-part rack.

6. The switching apparatus as claimed in claim 1, wherein the first component includes a predefined distance from the second component in a direction perpendicular to the insertion direction when the power circuit breaker is inserted into the withdrawable-part rack.

7. The switching apparatus as claimed in claim 6, wherein the first component of the locking device is mounted as a transverse strut between two opposing walls of the withdrawable-part rack.

8. The switching apparatus as claimed in claim 1, wherein the first component of the locking device is mounted as a transverse strut between two opposing walls of the withdrawable-part rack.

9. The switching apparatus as claimed in claim 1, wherein the second component includes a hook which engages behind the first component in the tilted position.

10. The switching apparatus as claimed in claim 9, wherein the second component includes a central section, which extends in the insertion direction, and an end section protruding perpendicularly thereto, and a ramp extending at an angle connecting the central section and the end section.

11. The switching apparatus as claimed in claim 1, wherein a foot section of the second component, by which the second component is fixed to the power circuit breaker, supports a vertical connection of the power circuit breaker.

12. The switching apparatus as claimed in claim 1, wherein the power circuit breaker is of three-pole or multipole design, and the locking device is fitted to the power circuit breaker and withdrawable-part rack for at least one pole.

13. A switching apparatus comprising:
   withdrawable means for arrangement in a switchgear assembly;
   a power circuit breaker, insertable into the withdrawable-part rack and assuming an inserted position in an inserted state; and
   locking means for locking the power circuit breaker in the withdrawable means, the locking means including,
      a first component, fixed to the withdrawable means, and
      a second component, fixed to the power circuit breaker, wherein the first component and the second component do not engage with one another in the inserted position, but engage with one another in a defined manner in a tilted position of the power circuit breaker, the tilted position is rotated with respect to the inserted position, with the result that the power circuit breaker is locked in the withdrawable means.

14. A locking device to lock a power circuit breaker in a withdrawable-part rack, the locking device comprising:
   a first component, fixed to the withdrawable-part rack, and
   a second component, fixed to the power circuit breaker, wherein the first component and the second component do not engage with one another in the inserted position, but engage with one another in a defined manner in a tilted position of the power circuit breaker, the tilted position is rotated with respect to the inserted position, with the result that the power circuit breaker is locked in the withdrawable-part rack.

* * * * *